United States Patent
Liu et al.

(10) Patent No.: US 10,151,948 B2
(45) Date of Patent: Dec. 11, 2018

(54) DISPLAY APPARATUS

(71) Applicant: Young Lighting Technology Inc., Hsin-Chu (TW)

(72) Inventors: Chin-Ku Liu, Hsin-Chu (TW); Jhong-Hao Wu, Hsin-Chu (TW)

(73) Assignee: Young Lighting Technology Inc., Hsin-Chu (TW)

( * ) Notice: Subject to any disclaimer, the term of this patent is extended or adjusted under 35 U.S.C. 154(b) by 50 days.

(21) Appl. No.: 15/051,669

(22) Filed: Feb. 24, 2016

(65) Prior Publication Data

US 2016/0266437 A1 Sep. 15, 2016

(30) Foreign Application Priority Data

Mar. 12, 2015 (CN) .......................... 2015 1 0107593

(51) Int. Cl.
*G02F 1/1335* (2006.01)
*G02F 1/1333* (2006.01)

(52) U.S. Cl.
CPC .... *G02F 1/133524* (2013.01); *G02F 1/13336* (2013.01); *G02F 1/133504* (2013.01); *G02F 2201/44* (2013.01)

(58) Field of Classification Search
CPC ......... G02F 1/133524; G02F 1/133308; G02F 1/133504; G02F 1/133528; G02F 1/133526; G02F 1/13336; G02F 2201/44
USPC .......................................................... 349/58
See application file for complete search history.

(56) References Cited

U.S. PATENT DOCUMENTS

| | | | |
|---|---|---|---|
| 2005/0069201 A1 | 3/2005 | Speigle et al. | |
| 2008/0129933 A1* | 6/2008 | Nishida | G02B 1/118 349/96 |
| 2011/0255301 A1 | 10/2011 | Watanabe | |
| 2012/0281289 A1* | 11/2012 | Itoh | G02B 5/0231 359/599 |
| 2013/0265348 A1 | 10/2013 | Onogi | |
| 2014/0132539 A1 | 5/2014 | Huang et al. | |
| 2014/0198316 A1 | 7/2014 | Chen et al. | |
| 2016/0139442 A1 | 5/2016 | Li et al. | |
| 2016/0267860 A1 | 9/2016 | Liu et al. | |
| 2016/0343308 A1* | 11/2016 | Hasegawa | G02F 1/133308 |

FOREIGN PATENT DOCUMENTS

| | | |
|---|---|---|
| CN | 1208668 | 6/2005 |
| CN | 201374154 | 12/2009 |
| CN | 101206848 | 7/2010 |
| CN | 101965604 | 2/2011 |
| CN | 102137244 | 7/2011 |
| CN | 103065551 | 4/2013 |

(Continued)

OTHER PUBLICATIONS

"Office Action of China Counterpart Application," dated Sep. 3, 2018, pp. 1-7.

*Primary Examiner* — Charles Chang
(74) *Attorney, Agent, or Firm* — JCIPRNET

(57) ABSTRACT

A display apparatus including at least one display unit is provided. The display unit includes a liquid crystal display (LCD) module and a self-luminous display module. The self-luminous display module is disposed on an edge of the LCD module. The display apparatus makes an effective use of a frame region of the LCD module for displaying, and maintains the characteristic of the LCD module.

25 Claims, 15 Drawing Sheets

(56) References Cited

FOREIGN PATENT DOCUMENTS

| CN | 103150970 | 6/2013 |
|---|---|---|
| CN | 104199212 | 12/2014 |
| JP | 2000321597 | 11/2000 |
| JP | 2007192977 | 8/2007 |
| TW | 561278 | 11/2003 |
| TW | 201419043 | 5/2014 |

* cited by examiner

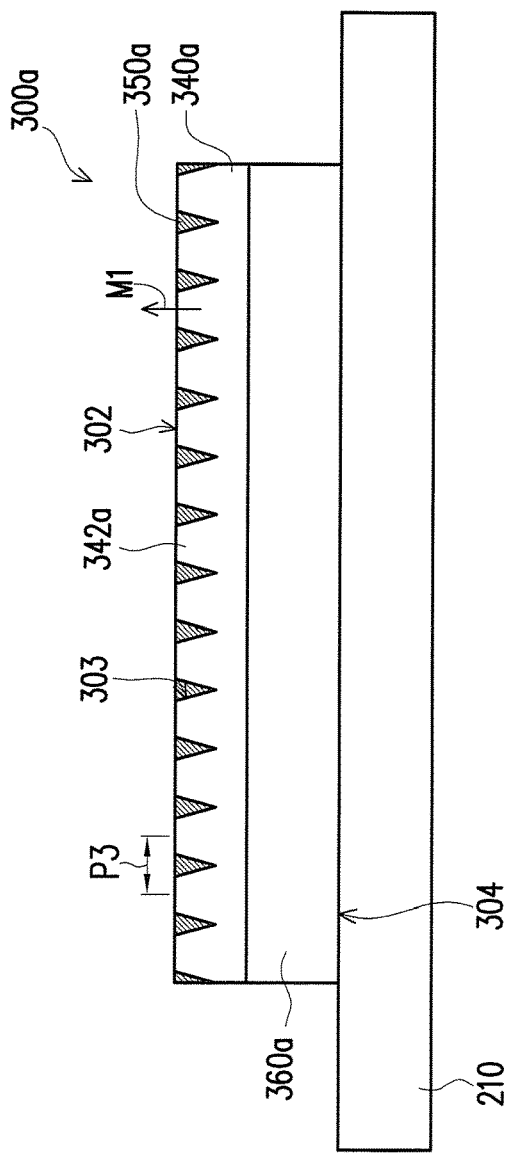
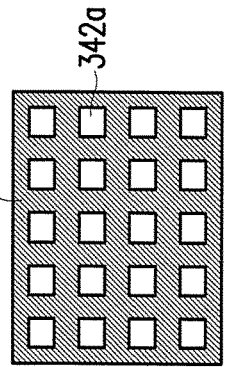
FIG. 2A
FIG. 2B

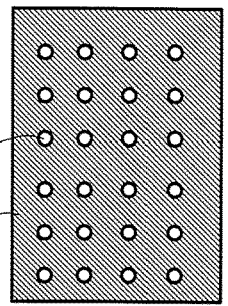
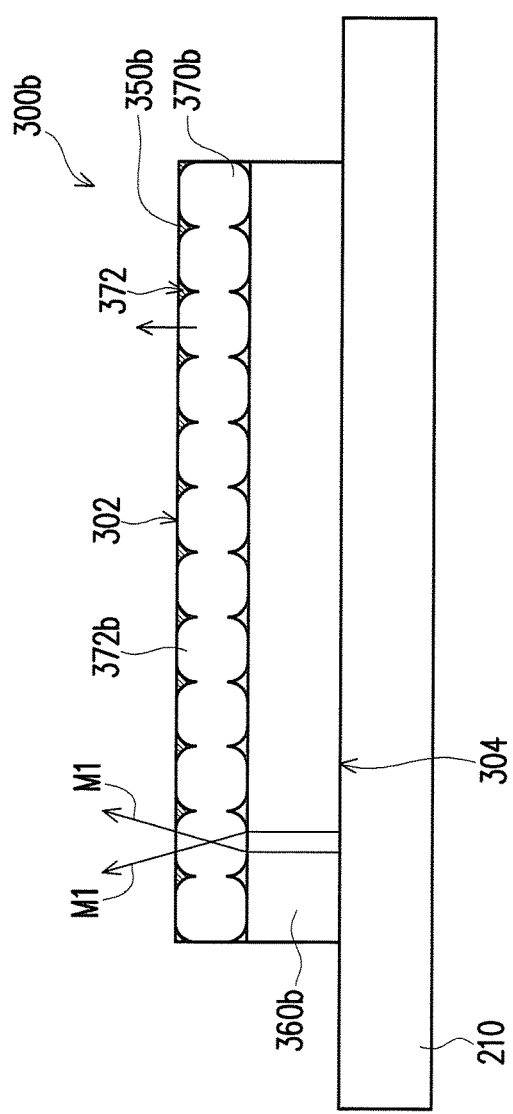
FIG. 3B
FIG. 3A

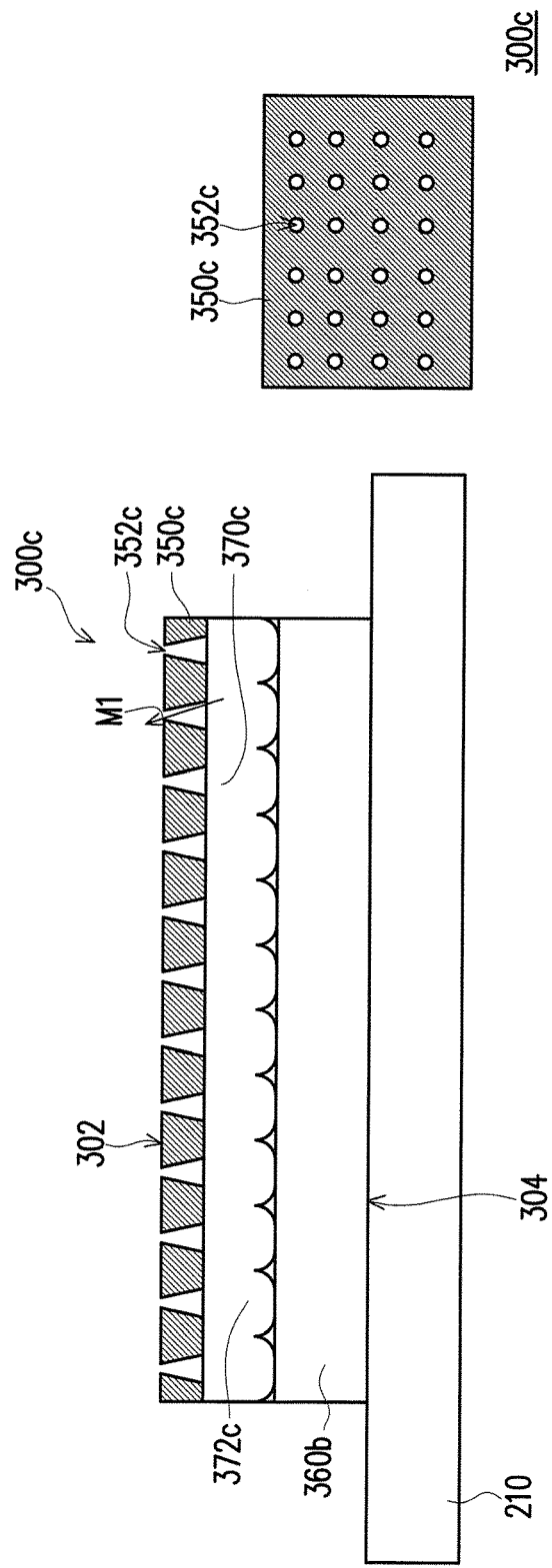

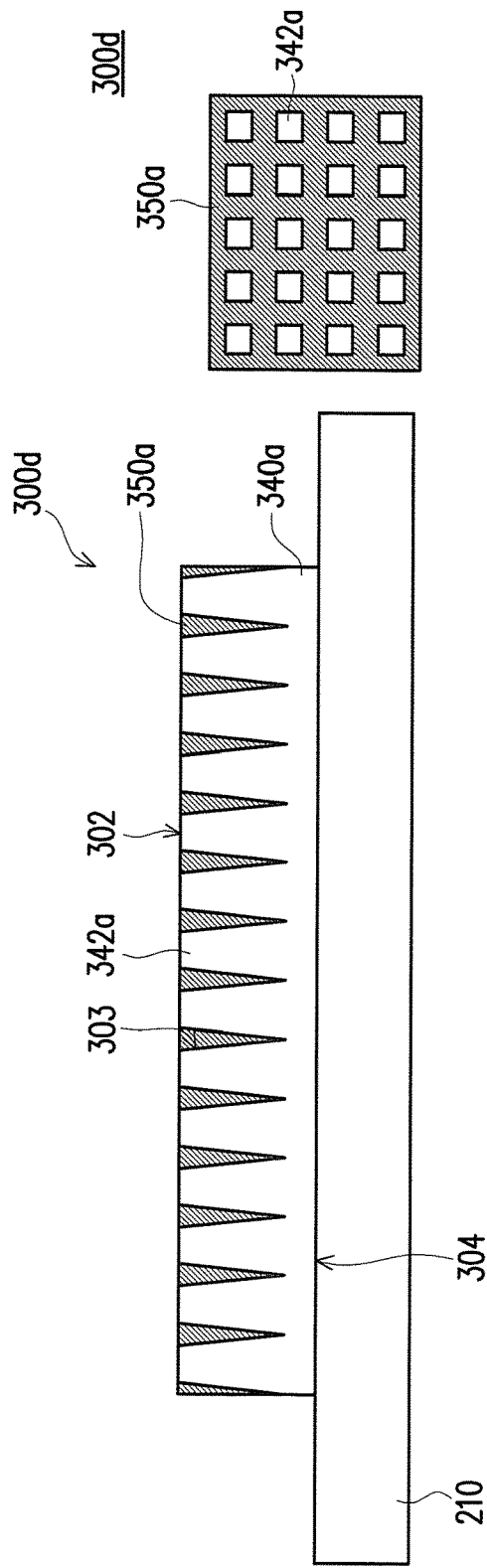

DISPLAY APPARATUS

CROSS-REFERENCE TO RELATED APPLICATION

This application claims the priority benefit of China application serial no. 201510107593.6, filed on Mar. 12, 2015. The entirety of the above-mentioned patent application is hereby incorporated by reference herein and made a part of this specification.

BACKGROUND OF THE INVENTION

Field of the Invention

The invention relates to a display apparatus.

Description of Related Art

Large screen display system is widely applied in control rooms of a plurality of domains such as telecommunication network management, public security police direct, traffic monitoring and management, military combat and training direct, industrial production scheduling, etc. The large screen display system can display signals of different signal sources in centralization, so as to meet user's demand for displaying a variety of sharing information and synthetic information in a large area. A commonly used large screen splicing television (TV) wall system is generally grouped into a liquid crystal display (LCD) splicing TV wall or a light-emitting diode (LED) splicing TV wall according to a working method of display units thereof.

In view of the so-called LCD splicing TV wall, a plurality of LCD display units are spliced, and a splicing control software system is used to implement a large screen display effect. The LCD splicing TV wall has advantages of thin thickness, light weight, low power consumption, long service life, no irradiation, exquisite display image, high resolution, and due to excellent performance of various key performance indicators, it has become a mainstream of development, and has a good prospect. Although the LCD has the aforementioned advantages, when the LCDs are used as the display units of the splicing TV wall, limited by an invalid area of the LCD panel and a front frame mechanism, a splicing gap of the LCDs is relatively large.

In view of the so-called LED splicing TV wall, the LED splicing TV wall is formed by splicing a plurality of LEDs to serve as the display units, in which an active light-emitting property and a small pitch technique of the LEDs are used to support a high resolution display. The LED display unit does not contain hazardous substances such as mercury, infrared, ultraviolet, etc., and has a high efficiency in energy saving, and a service life thereof is up to 100,000 hours (8-10 years), which is superior to the service life of 5-6 years of the LCD display unit. However, the biggest problems of the LED splicing TV wall are resolution and cost. Limited by a package size of the LEDs and due to a circuit limitation, a pitch of the currently mass-produced smallest LEDs is generally larger than a pitch of the LCD pixels. When a display size is excessively small, it probably unable to reach a high resolution by using the LEDs.

Moreover, when each LED is used as a display pixel, taking a resolution of 1920×1080 as an example, at least 2,000,000 LEDs are required, and each LED contains RGB light-emitting chips. Namely, totally 2,000,000 red light-emitting chips, 2,000,000 green light-emitting chips and 2,00,000 blue light-emitting chips are required, which leads to a high cost.

The information disclosed in the "BACKGROUND OF THE INVENTION" section is only for enhancement of understanding of the background of the described technology, and therefore it may contain information that does not form the prior art that is already known to a person of ordinary skill in the art. Further, the information disclosed in the "BACKGROUND OF THE INVENTION" section does not mean that one or more problems to be resolved by one or more embodiments of the invention was acknowledged by a person of ordinary skill in the art.

SUMMARY OF THE INVENTION

The invention is directed to a display apparatus, which has a characteristic of a liquid crystal display (LCD) module, and is able to make an effective use of a frame region of the LCD module to display.

Other objects and advantages of the invention can be further illustrated by the technical features broadly embodied and described as follows.

In order to achieve one or a portion of or all of the objects or other objects, an embodiment of the invention provides a display apparatus including at least one display unit. The display unit includes a liquid crystal display (LCD) module and a self-luminous display module. The self-luminous display module is disposed on an edge of the LCD module.

In an embodiment of the invention, the LCD module includes an LCD panel and a frame. The frame covers an edge of the LCD panel, where the self-luminous display module is disposed on the frame.

In an embodiment of the invention, the self-luminous display module includes a plurality of light-emitting diodes arranged in an array.

In an embodiment of the invention, the display unit further includes an image reforming light transmission element disposed on the LCD module. The image reforming light transmission element has a first surface facing away from the LCD module and a second surface facing the LCD module. An image beam coming from an image displayed by the LCD module passes through the image reforming light transmission element to form another image on the first surface.

In an embodiment of the invention, the first surface and a display surface of the self-luminous display module are substantially coplanar.

In an embodiment of the invention, the image reforming light transmission element includes a transparent board, a diffuser and a polarizer. The transparent board is disposed on the LCD module, the diffuser is disposed on the transparent board, and the polarizer is disposed on the diffuser, where the diffuser is located between the transparent board and the polarizer.

In an embodiment of the invention, the image reforming light transmission element includes a first transparent board and a light absorbing element. The first transparent board has the first surface, and the first transparent board has a plurality of notches on the first surface. The light absorbing element is disposed in the notches, wherein a part of the first transparent board surrounded by the light absorbing element forms a plurality of light guiding pipes.

In an embodiment of the invention, a width of the light guiding pipes is progressively decreased from an end close to the second surface towards an end close to the first surface.

In an embodiment of the invention, a width of the light guiding pipes is progressively increased from an end close to the second surface towards an end close to the first surface.

In an embodiment of the invention, the image reforming light transmission element further includes a second transparent board disposed between the first transparent board and the LCD module.

In an embodiment of the invention, the light absorbing element includes a transparent substrate and a light absorbing material. A refractive index of the transparent substrate is lower than a refractive index of the first transparent board, and the light absorbing material is doped into the transparent substrate.

In an embodiment of the invention, a pitch of two adjacent light guiding pipes is smaller than or equal to a pitch of two adjacent pixels of the LCD module.

In an embodiment of the invention, the image reforming light transmission element includes a transparent board, a lens array and a light absorbing element. The transparent board is disposed on the LCD module. The lens array is disposed on the transparent board, and has a plurality of micro lenses arranged in an array. The light absorbing element is disposed on the first surface, and is disposed in notches between two adjacent micro lenses.

In an embodiment of the invention, the light absorbing element includes a transparent substrate and a light absorbing material. A refractive index of the transparent substrate is lower than a refractive index of the lens array, and the light absorbing material is doped into the transparent substrate.

In an embodiment of the invention, the image reforming light transmission element includes a transparent board, a lens array and a light absorbing sheet. The transparent board is disposed on the LCD module. The lens array is disposed on the transparent board, and has a plurality of micro lenses arranged in an array. The light absorbing sheet is disposed on the lens array, and has a plurality of holes arranged in an array, wherein the holes are substantially respectively disposed on focuses of the micro lenses.

In an embodiment of the invention, a hole diameter of the holes is progressively decreased from an end close to the lens array towards an end away from the lens array.

In an embodiment of the invention, the display unit further includes a transparent cover covering the self-luminous display module and the image reforming light transmission element.

In an embodiment of the invention, the at least one display unit includes a plurality of display units, and the display units are spliced into the display apparatus, and the self-luminous display modules of any two adjacent display units are connected to each other.

In an embodiment of the invention, the self-luminous display module covers the edge of the LCD module, and surrounds a display region of the LCD module.

In an embodiment of the invention, the display unit further includes an image reforming light transmission element disposed on the LCD module and the self-luminous display module. The image reforming light transmission element has a first surface facing away from the LCD module and a second surface facing the LCD module. An image beam coming from an image displayed by the LCD module and another image beam coming from the self-luminous display module pass through the image reforming light transmission element to form another image on the first surface.

In an embodiment of the invention, the image reforming light transmission element includes a transparent board, a diffuser and a polarizer. The transparent board is disposed on the LCD module, and the diffuser is disposed on the transparent board and disposed on the self-luminous display module. The polarizer is disposed on the diffuser and disposed above the self-luminous display module, wherein the diffuser is located between the transparent board and the polarizer.

In an embodiment of the invention, the image reforming light transmission element includes a first transparent board and a light absorbing element. The first transparent board has the first surface, and the first transparent board has a plurality of notches on the first surface, wherein the first surface is located above the LCD module and the self-luminous display module. The light absorbing element is disposed in the notches, where a part of the first transparent board surrounded by the light absorbing element forms a plurality of light guiding pipes.

In an embodiment of the invention, the image reforming light transmission element includes a transparent board, a lens array and a light absorbing element. The transparent board is disposed on the LCD module. The lens array is disposed on the transparent board and the self-luminous display module, and has a plurality of micro lenses arranged in an array. The light absorbing element is disposed on the first surface, and is disposed in the notches between two adjacent micro lenses.

In an embodiment of the invention, the image reforming light transmission element includes a transparent board, a lens array and a light absorbing sheet. The transparent board is disposed on the LCD module. The lens array is disposed on the transparent board and the self-luminous display module, and has a plurality of micro lenses arranged in an array. The light absorbing sheet is disposed on the lens array, and has a plurality of holes arranged in an array, where the holes are substantially respectively disposed on focuses of the micro lenses.

The embodiments of the invention have at least one of the following advantages and effects. In the display apparatus according to the embodiments of the invention, since a design of disposing the self-luminous display module on the edge of the LCD module is adopted, the edge region of the LCD module is effectively used for displaying, and the characteristic of the LCD module is maintained. Moreover, the image reforming light transmission element is used to provide natural continuous and integral images, so as to decrease a difference between the display effects of the LCD module and the self-luminous display module, by which image contrast and light usage rate are enhanced.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 2A is a cross-sectional view of an LCD module and an image reforming light transmission element in a display apparatus according to another embodiment of the invention.

FIG. 2B is a top view of the image reforming light transmission element of FIG. 2A.

FIG. 3A is a cross-sectional view of an LCD module and an image reforming light transmission element in a display apparatus according to still another embodiment of the invention.

FIG. 3B is a top view of the image reforming light transmission element of FIG. 3A.

FIG. 4A is a cross-sectional view of an LCD module and an image reforming light transmission element in a display apparatus according to yet another embodiment of the invention.

FIG. 4B is a top view of the image reforming light transmission element of FIG. 4A.

FIG. 5A is a cross-sectional view of an LCD module and an image reforming light transmission element in a display apparatus according to still another embodiment of the invention.

FIG. 5B is a top view of the image reforming light transmission element of FIG. 5A.

DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention.

Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the term's "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
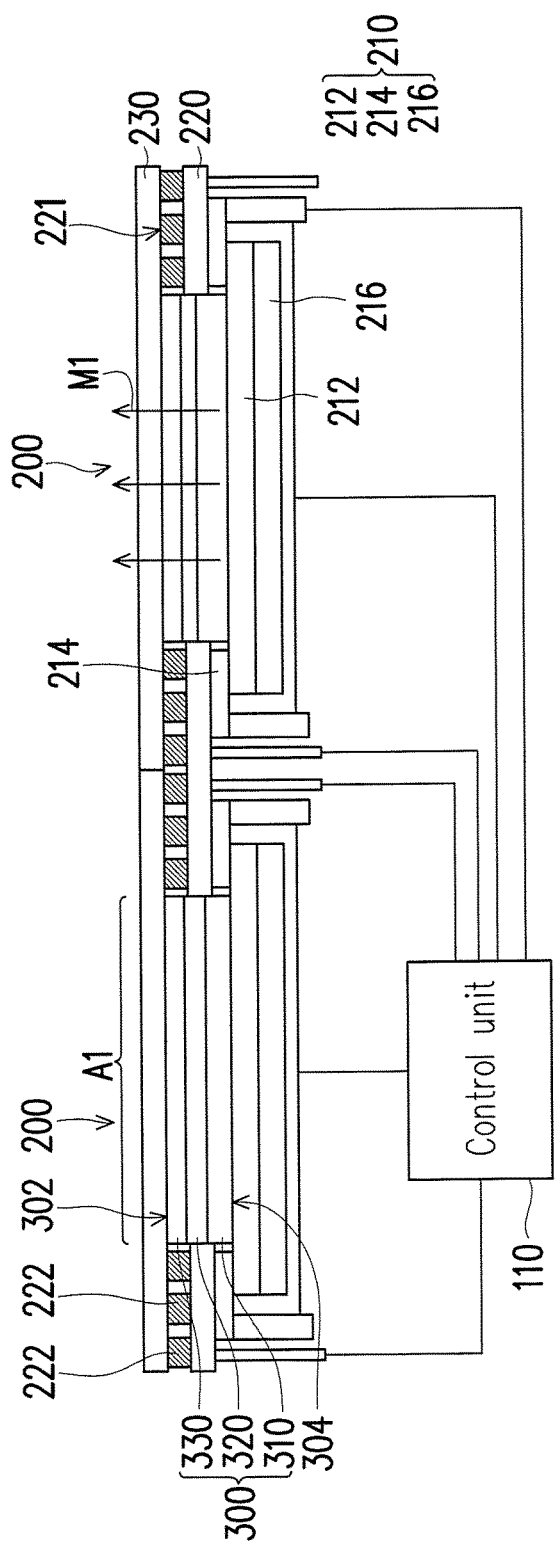
FIG. 1A is a cross-sectional view of a display apparatus according to an embodiment of the invention.
Figure 1C:
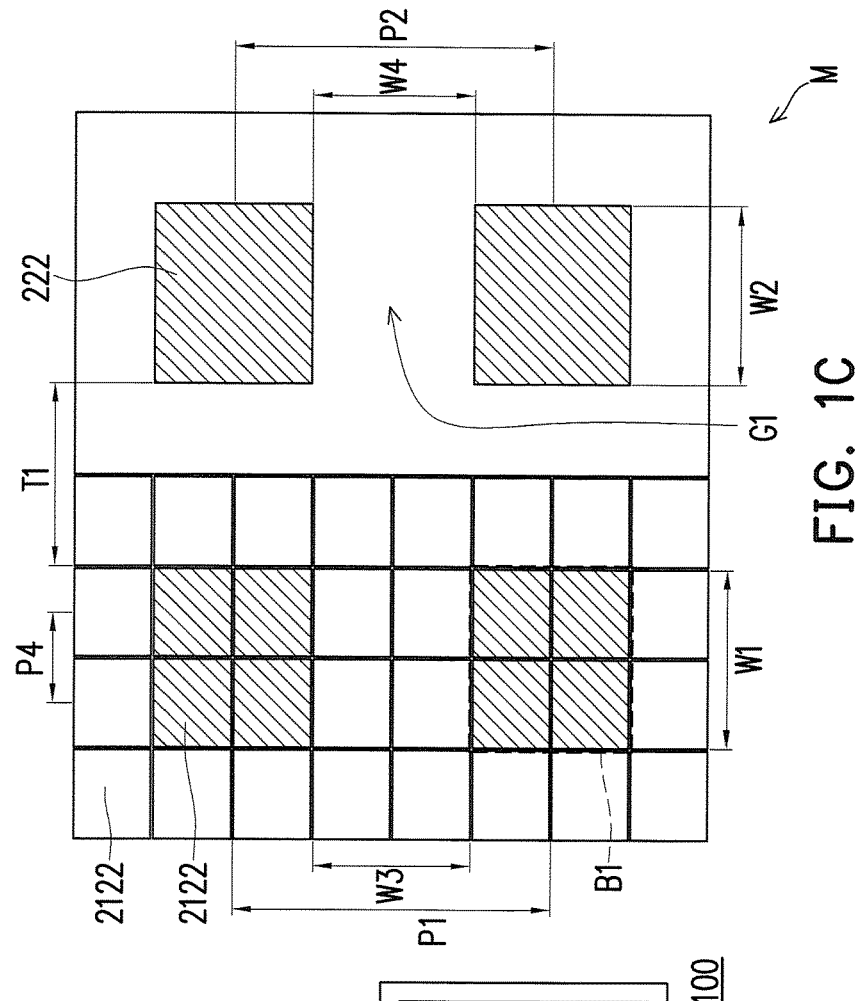
FIG. 1C is a partial enlarged view of a region M of the display apparatus of FIG. 1B.
Figure 1B:
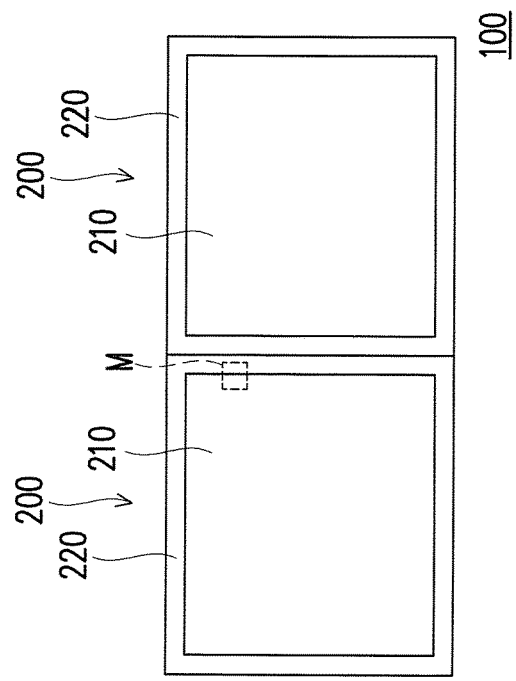
FIG. 1B is a front view of the display apparatus of FIG. 1A.

FIG. 1A is a cross-sectional view of a display apparatus according to an embodiment of the invention. FIG. 1B is a front view of the display apparatus of FIG. 1A, and FIG. 1C is a partial enlarged view of a region M of the display apparatus of FIG. 1B. Referring to FIG. 1A, FIG. 1B and FIG. 1C, the display apparatus 100 of the embodiment includes at least one display unit 200 (in FIG. 1, a plurality of display units 200 are illustrated). The display unit 200 includes a liquid crystal display (LCD) module 210 and a self-luminous display module 220. The self-luminous display module 220 is disposed on an edge of the LCD module 210. In the embodiment, the LCD module 210 includes an LCD panel 212 and a frame 214. The frame 214 covers an edge of the LCD panel 212 and exposes a display region A1 of the LCD module 210. The self-luminous display module 220 is disposed on the frame 214, i.e. the self-luminous display module 220 is disposed on a non-display region (which is not indicated) of the LCD module 210. In the embodiment, the self-luminous display module 220 includes a plurality of light-emitting units 222 arranged in an array, wherein the light-emitting units 222 are, for example, light-emitting diodes (LEDs). Further, each of the LEDs is, for example, formed by packaging a red light-emitting chip, a green light-emitting chip, a blue light-emitting chip, though the invention is not limited thereto. In other embodiments, the LEDs, for example, include red LEDs, green LEDs and blue LEDs.

In the embodiment, the display units 200 are spliced into the display apparatus 100, and the self-luminous display modules 220 of any two adjacent display units 200 are connected to each other. Moreover, in the embodiment, the self-luminous display module 220 covers the edge of the LCD module 210, and surrounds the display region A1 of the LCD module 210.

In the display apparatus 100 of the embodiment, since the self-luminous display module 220 is capable of displaying images, by disposing the self-luminous display module 220 capable of displaying images on the edge (for example, the frame 214) of the LCD module 210, the edge region (for example, the frame region) of the LCD module 210 is effectively used for displaying, and the characteristic of the LCD module 210 is maintained. In detail, by adopting the design of disposing the self-luminous display module 220 on the frame 214, a problem that the frame 214 of the LCD module 210 cannot display images is effectively resolved. Moreover, the display region A1 within the frame 214 can still implement display through pixels of the LCD module 210, i.e. compared to the self-luminous display module 220, a display pattern with a low cost can be used for displaying. Moreover, when it is required to display a high resolution image in the display region A1, by using the display pattern of the LCD module 210, the effects of low cost and high resolution can be simultaneously achieved.

In the embodiment, the display unit 200 further includes an image reforming light transmission element 300 disposed on the LCD module 210. The image reforming light transmission element 300 has a first surface 302 facing away from the LCD module 210 and a second surface 304 facing the LCD module 210. An image beam M1 coming from an image displayed by the LCD module 210 passes through the image reforming light transmission element 300 to form another image on the first surface 302. In the embodiment, the first surface 302 and a display surface 221 of the self-luminous display module 220 are substantially coplanar. In this way, the other image formed by the image reforming light transmission element 300 and an image displayed by the self-luminous display module 220 are substantially in a same height. Therefore, even if a user views the display apparatus 100 in an oblique viewing angle, the user can still view a natural continuous and integral image without feeling that the images are in different heights to have a feeling of image splicing.

In the embodiment, the image reforming light transmission element 300 includes a transparent board 310, a diffuser 320 and a polarizer 330. The transparent board 310 is disposed on the LCD module 210, the diffuser 320 is disposed on the transparent board 310, and the polarizer 330 is disposed on the diffuser 320, where the diffuser 320 is located between the transparent board 310 and the polarizer 330.

In the embodiment, the LCD module 210 further includes a backlight module 216, and the backlight module 216 can be a backlight module capable of emitting a collimated light, i.e. the emitted light has a smaller angle of divergence. In this way, after the light emitted by the back light module 216 passes through the LCD panel 212 in collimation, the light forms the collimated image beam M1. After the collimated image beam M1 passes through the transparent board 310, the collimated image beam M1 forms another image similar to the image displayed by the LCD module 210 under a diffusion function of the diffuser 320. In the embodiment, the diffuser 320 can be a diffuser capable of maintaining polarization of the image beam M1 coming from the LCD module 210 though producing a diffusion effect thereto in a direction perpendicular to a polarization direction of the image beam M1, or can be a dual brightness enhancement film (DBEF) capable of producing a fog effect (i.e. the diffusion effect) to the image beam M1 though still maintaining the polarization of the image beam M1 coming from the LCD module 210. Moreover, a penetrating axis (not shown) of the polarizer 330 can be substantially parallel to the polarization direction of the image beam M1 to facilitate the image beam M1 passing therethrough, and enhance the image contrast.

In the embodiment, the display unit 200 further includes a transparent cover 230 made of, for example, glass or a plastic material and covering the self-luminous display module 220 and the image reforming light transmission element 300 to protect the LCD module 210 and the self-luminous display module 220.

FIG. 2A is a cross-sectional view of an LCD module and an image reforming light transmission element in a display apparatus according to another embodiment of the invention, and FIG. 2B is a top view of the image reforming light transmission element of FIG. 2A. Referring to FIG. 2A and FIG. 2B, the image reforming light transmission element 300a of the embodiment is similar to the image reforming light transmission element 300 of FIG. 1A, and a difference therebetween is as follows. The image reforming light transmission element 300a of the embodiment includes a first transparent board 340a and a light absorbing element 350a. The first transparent board 340a has a first surface 302, and the first transparent board 340a has a plurality of notches 303 on the first surface 302. The light absorbing element 350a is disposed in the notches 303, where a part of the first transparent board 340a surrounded by the light absorbing element 350a forms a plurality of light guiding pipes 342a.

In the embodiment, a width of the light guiding pipes 342a is progressively decreased from an end close to the second surface 304 towards an end close to the first surface 302. Moreover, in the embodiment, the image reforming light transmission element 300a further includes a second transparent board 360a disposed between the first transparent board 340a and the LCD module 210.

The light absorbing element 350a includes a transparent substrate and a light absorbing material. A refractive index of the transparent substrate is lower than a refractive index of the first transparent board 340a, and the light absorbing material is doped into the transparent substrate, where the light absorbing material is, for example, black ink, though the invention is not limited thereto. In the embodiment, the image beam M1 coming from the image displayed by the LCD module 210 is propagated to the first transparent board 340a through the second transparent board 360a, and the light guiding pipes 342a guide the image beam M1 to the first surface 302, so as to form another image similar to the image displayed by the LCD module 210 on the first surface 302. Since the refractive index of the transparent substrate is lower than the refractive index of the first transparent board 340a, a part of the image beam M1 propagated in the light guiding pipes 342a is totally reflected by an interface between the light guiding pipes 342a and the transparent substrate of the light absorbing element 350a, such that a light usage rate is improved. Moreover, the light absorbing material of the light absorbing element 350a is mainly used for absorbing or blocking an external light (not shown), so as to present a black ground color under a bright environment and accordingly enhance the image contrast. The light absorbing material is, for example, black ink or other pigment, though the invention is not limited thereto.

Moreover, in the embodiment, a pitch P3 of two adjacent light guiding pipes 342a is smaller than or equal to a pitch P4 of two adjacent pixels 2122 of the LCD module 210 (referring to FIG. 1C). In this way, clarity of the image formed by the image reforming light transmission element 300a is ensured.

FIG. 3A is a cross-sectional view of an LCD module and an image reforming light transmission element in a display apparatus according to still another embodiment of the invention, and FIG. 3B is a top view of the image reforming light transmission element of FIG. 3A. Referring to FIG. 3A and FIG. 3B, the image reforming light transmission element 300b of the embodiment is similar to the image reforming light transmission element 300a of FIG. 2A, and a difference therebetween is as follows. The image reforming light transmission element 300b of the embodiment includes a transparent board 360*b*, a lens array 370*b* and a light absorbing element 350*b*. The transparent board 360*b* is disposed on the LCD module 210. The lens array 370*b* is disposed on the transparent board 360*b*, and has a plurality of micro lenses 372*b* arranged in an array. The light absorbing element 350*b* is disposed on the first surface 302, and the light absorbing element 350*b* is disposed on the lens array 370*b* and is disposed in notches 372 between each two adjacent micro lenses 372*b*. The first surface 302 of the image reforming light transmission element 300*b* is a surface commonly formed by an upper surface of the lens array 370*b* and an upper surface of the light absorbing element 350*b*. Moreover, a material of the light absorbing element 350*b* can be the same as the material of the light absorbing element 350*a* (shown in FIG. 2B), i.e. the light absorbing element 350*b* also includes a transparent substrate and a light absorbing material. In the embodiment, a refractive index of the transparent substrate is lower than a refractive index of the lens array 370*b*, and the light absorbing material is doped into the transparent substrate. The micro lenses 372*b* can converge the image beam M1 coming from the image displayed by the LCD module 210 to a position on the first surface 302 uncovered by the light absorbing element 350*b*, so as to form another image similar to the image displayed by the LCD module 210 on the first surface 302.

FIG. 4A is a cross-sectional view of an LCD module and an image reforming light transmission element in a display apparatus according to yet another embodiment of the invention, and FIG. 4B is a top view of the image reforming light transmission element of FIG. 4A. Referring to FIG. 4A and FIG. 4B, the image reforming light transmission element 300*c* of the embodiment is similar to the image reforming light transmission element 300*b* of FIG. 3A, and a difference therebetween is as follows. In the embodiment, the image reforming light transmission element 300*c* includes a light absorbing sheet 350*c* having the first surface 302. The light absorbing sheet 350*c* is disposed on the lens array 370*c*, and has a plurality of holes 352*c* arranged in an array, wherein the holes 352*c* are substantially respectively disposed on focuses of the micro lenses 372*c* of the lens array 370*c*. In the embodiment, a hole diameter of the holes 352*c* is progressively decreased from an end close to the lens array 370*c* towards an end away from the lens array 370*c*.

The micro lenses 372*c* can converge the image beam M1 coming from the image displayed by the LCD module 210 to the first surface 302 at a position of the holes 352*c*, so as to form another image similar to the image displayed by the LCD module 210 on the first surface 302. Namely, through a converging function of the micro lenses 372*c*, the image beam M1 can penetrate through the light absorbing sheet 350*c* through the holes 352*c*.

FIG. 5A is a cross-sectional view of an LCD module and an image reforming light transmission element in a display apparatus according to still another embodiment of the invention, and FIG. 5B is a top view of the image reforming light transmission element of FIG. 5A. Referring to FIG. 5A and FIG. 5B, the image reforming light transmission element 300*d* of the embodiment is similar to the image reforming light transmission element 300*a* of FIG. 2A, and a difference therebetween is as follows. In the image reforming light transmission element 300*d* of the embodiment, the second transparent board 360*a* of FIG. 2A is not adopted. Namely, in FIG. 5A, a width of the light guiding pipes 342*a* is progressively decreased from an end close to the second surface 304 towards an end close to the first surface 302. Moreover, the end of the light guiding pipe 342*a* close to the LCD module 210 is closer to the LCD module 210 compared to that of the structure of FIG. 2A. Alternatively, in another embodiment, the light guiding pipes 342*a* can extend to the LCD module 210.

Figure 6:
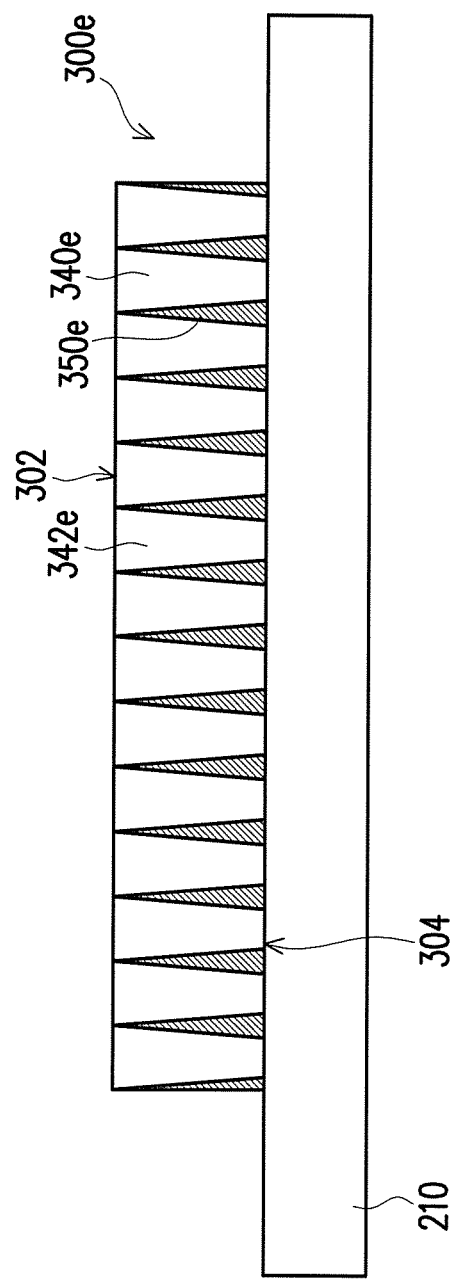
FIG. 6 is a cross-sectional view of an LCD module and an image reforming light transmission element in a display apparatus according to still another embodiment of the invention.

FIG. 6 is a cross-sectional view of an LCD module and an image reforming light transmission element in a display apparatus according to still another embodiment of the invention. Referring to FIG. 6, the image reforming light transmission element 300*e* of the embodiment is similar to the image reforming light transmission element 300*d* of FIG. 5A, and a difference therebetween is as follows. In the image reforming light transmission element 300*e* of the embodiment, a width of the light guiding pipes 342*e* is progressively increased from an end close to the second surface 304 towards an end close to the first surface 302.

Figure 7:
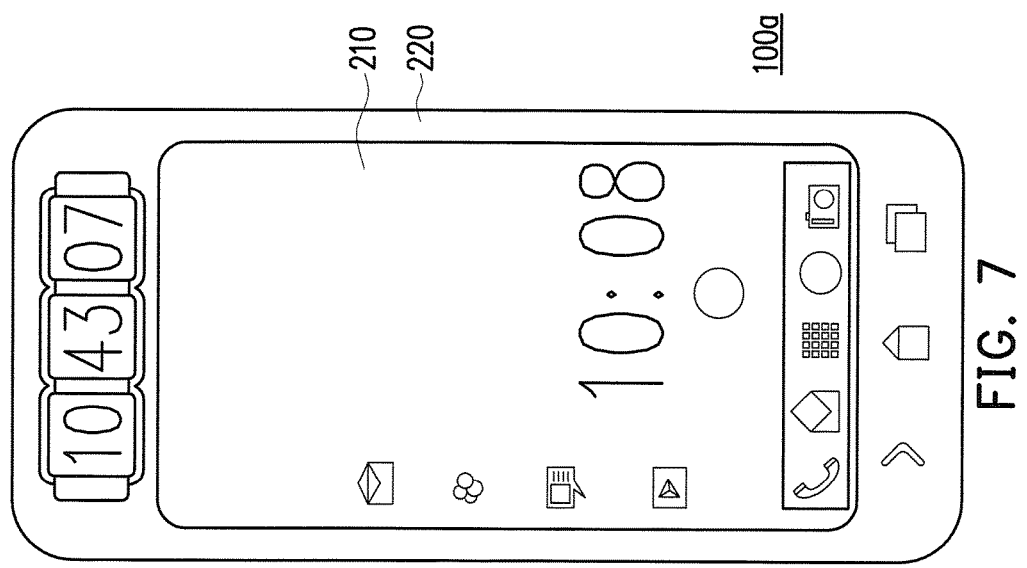
FIG. 7 is a front view of a display apparatus according to another embodiment of the invention.

FIG. 7 is a front view of a display apparatus according to another embodiment of the invention. Referring to FIG. 7, the display apparatus 100*a* of the embodiment is similar to the display apparatus 100 of FIG. 1B, and differences therebetween are as follows. The display apparatus 100*a* of the embodiment can serve as a screen of an electronic device, wherein the electronic device is, for example, a smart phone, a tablet personal computer (PC) or a personal digital assistant (PDA), though the invention is not limited thereto. In the embodiment, the LCD module 210 is used for displaying delicate images with a high resolution, and the self-luminous display module 220 is used for displaying images or texts with less requirement on resolution such as key icons, time, reminder messages, etc.

A display method of the aforementioned display apparatus is introduced below with reference of the display apparatus of FIG. 1A to FIG. 1C.

Referring to FIG. 1A to FIG. 1C, the display apparatus 100 further includes a control unit 110. The control unit 110 is electrically connected to the LCD module 210 and the self-luminous display module 220, and matches optical parameters of the LCD module 210 with optical parameters of the self-luminous display module 220.

In the embodiment, the self-luminous display module 220 includes a plurality of light-emitting units 222 arranged in an array. The optical parameters of the LCD module 210 and the optical parameters of the self-luminous display module 220 respectively include a position and a size of a light-emitting region. In detail, the control unit 110 turns on a part of pixels 2122 (for example, the pixels 2122 indicated by slashes in FIG. 1C) of the LCD module 210 to form a plurality of bright regions B1 arranged in an array and separated from each other, so as to simulate the light-emitting units 222 of the self-luminous display module 220. The control unit 110 turns off the other part of pixels 2122 (for example, the pixels 2122 indicated by blank square in FIG. 1C) of the LCD module 210 to form a dark region, so as to simulate a gap G1 between the light-emitting units 222 of the self-luminous display module 220.

In the embodiment, each of the light-emitting units 222 is a light-emitting diode (LED), and a pitch P1 of the bright regions B1 is substantially equal to a pitch P2 of the light-emitting units 222.

In the embodiment, each of the bright regions B1 is composed of a plurality of turned-on pixels 2122 (for example, four turned-on pixels 2122 formed one bright region B1 is illustrated) in the LCD module 210, and a width W2 of a light-emitting region (i.e. the slashed part of the light-emitting unit 222 in FIG. 1C) of each of the light-emitting units 222 is substantially equal to a width W1 of each bright region B1. Moreover, in the embodiment, a width W3 of the dark region between any two adjacent bright regions B1 is substantially equal to an interval W4 between any two adjacent light-emitting units 222.

In addition, in the embodiment, an interval T1 between the bright region B1 and the light-emitting unit 222 adjacent to each other along a direction parallel to a display surface of the LCD module 210 is substantially equal to the interval W4 between two adjacent light-emitting units 222, and is substantially equal to an interval (which is equivalent to the width W3) between two adjacent bright regions B1.

In the embodiment, each of the light-emitting units 222 is, for example, an LED formed by packaging a red light-emitting chip, a green light-emitting chip, a blue light-emitting chip, so that the light-emitting region of each of the light-emitting units 222 is, for example, a display pixel of the self-luminous display module 220, i.e. each pixel of the self-luminous display module 220 includes a light-emitting unit of a different color. Since the bright region B1 of the LCD module 210 is consistent with the light-emitting region of each of the light-emitting units 222 of the self-luminous display module 220, in other words, the display pixels of the LCD module 210 are consistent with the display pixels of the self-luminous display module 220, the resolutions of the images provided by the LCD module 210 and the self-luminous display module 220 are consistent and evenly distributed, such that a user cannot identify a difference between display effects of the LCD module 210 and the self-luminous display module 220.

Figure 8:
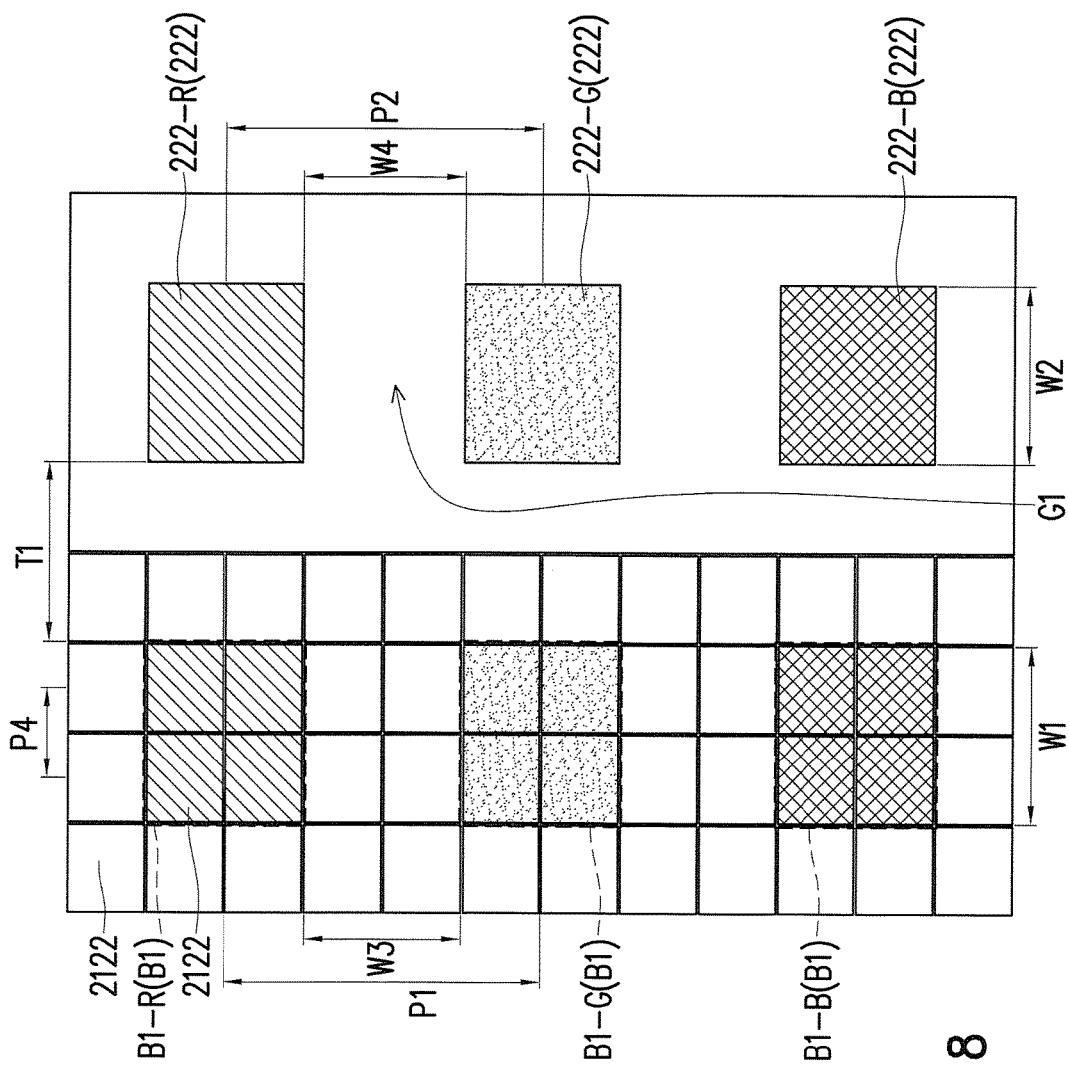
FIG. 8 is a partial enlarged view of a display apparatus according to another embodiment of the invention.

In other embodiments, as shown in FIG. 8, the embodiment of FIG. 8 is similar to the embodiment of FIG. 1C, and differences therebetween are as follows. Each of the light-emitting units 222 is an LED, and the LEDs, for example, include red LEDs, green LEDs and blue LEDs, so that the light-emitting region of each of the light-emitting units 222 is, for example, a sub display pixel of the self-luminous display module 220. In other words, each pixel of the self-luminous display module 220 includes a plurality of light-emitting units 222 of different colors. For example, in FIG. 8, a light-emitting unit 222-R of the self-luminous display module 220 is a red LED, a light-emitting unit 222-G is a green LED, and a light-emitting unit 222-B is a blue LED, and all pixels 2122 in the bright region B1-R of the LCD module 210 display a red color, all pixels 2122 in the bright region B1-G display a green color, and all pixels 2122 in the bright region B1-B display a blue color. In this way, the resolutions of the images provided by the LCD module 210 and the self-luminous display module 220 are consistent and evenly distributed, such that the user cannot identify the difference between the display effects of the LCD module 210 and the self-luminous display module 220.

In other embodiments, when a maximum display light intensity of the self-luminous display module 220 is greater than a maximum display light intensity of the LCD module 210, a light-shielding plate can be disposed on the self-luminous display module 220, so as to decrease the maximum display light intensity of the self-luminous display module 220. The light-shielding plate is, for example, a polarizer or a filter, which is configured to reflect or filter a part of image beam M2 (referring to FIG. 9) emitted by the self-luminous display module 220. In an embodiment, the light-shielding plate can be disposed on the image reforming light transmission element. In this way, a luminance of the self-luminous display module 220 is close to a luminance of the LCD module 210.

Figure 9:
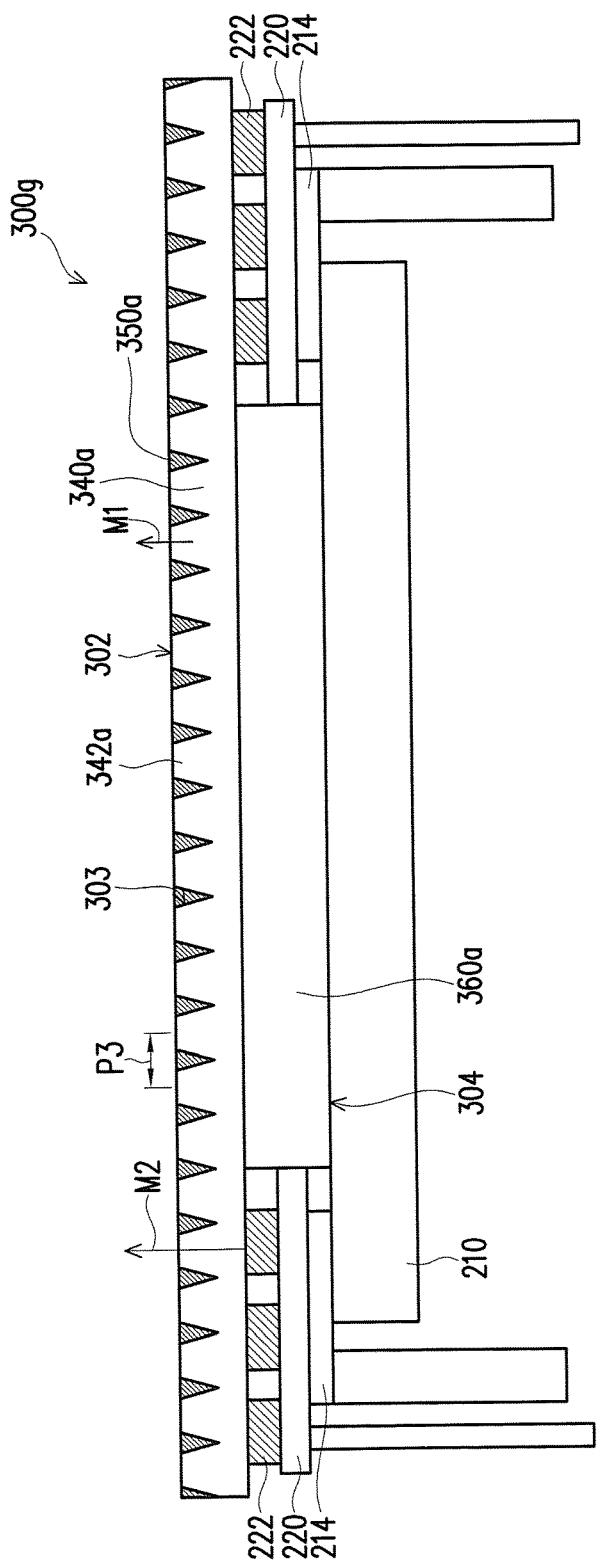
FIG. 9 is a partial schematic diagram of a display apparatus according to still another embodiment of the invention.

FIG. 9 is a partial schematic diagram of a display apparatus according to still another embodiment of the invention. Referring to FIG. 9, the display apparatus of the embodiment is similar to the display apparatus of FIG. 2A, and a difference therebetween is as follows. In the embodiment, the image reforming light transmission element 300g is disposed on the LCD module 210 and the self-luminous display module 220, and the image beam M1 coming from the image displayed by the LCD module 210 and another image beam M2 coming from the self-luminous display module 220 respectively pass through the image reforming light transmission element 300g to form another image on the first surface 302. In this way, the difference between the display effects of the LCD module 210 and the self-luminous display module 220 is further decreased.

In detail, in the embodiment, the first transparent board 340a is further disposed on the self-luminous display module 220, and the light guiding pipes 342a are also located above the self-luminous display module 220. Therefore, the first surface 302 of the image reforming light transmission element 300g is located above the LCD module 210 and the self-luminous display module 220.

Figure 10:
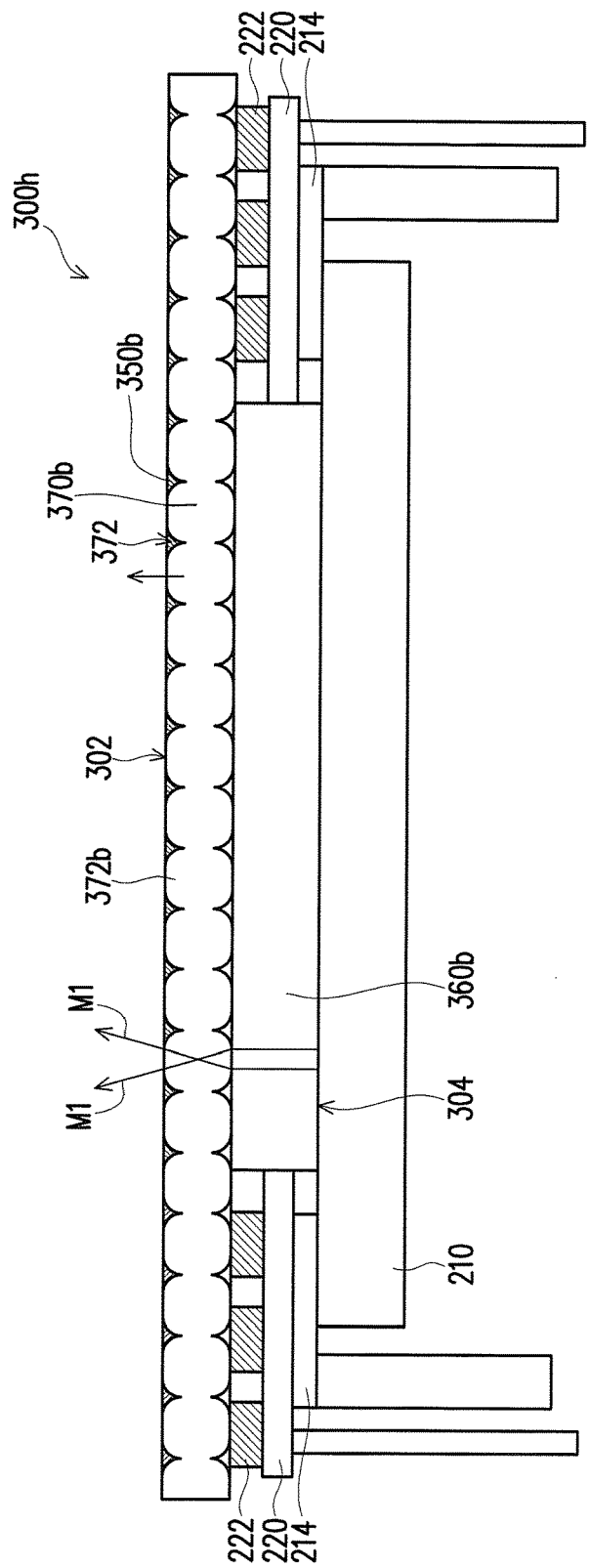
FIG. 10 is a partial schematic diagram of a display apparatus according to still another embodiment of the invention.

FIG. 10 is a partial schematic diagram of a display apparatus according to still another embodiment of the invention. Referring to FIG. 10, the display apparatus of the embodiment is similar to the display apparatus of FIG. 3A, and a difference therebetween is as follows. In the embodiment, the lens array 370b of the image reforming light transmission element 300h is also disposed on the self-luminous display module 220, and the light absorbing element 350b is also located above the self-luminous display module 220.

Figure 11:
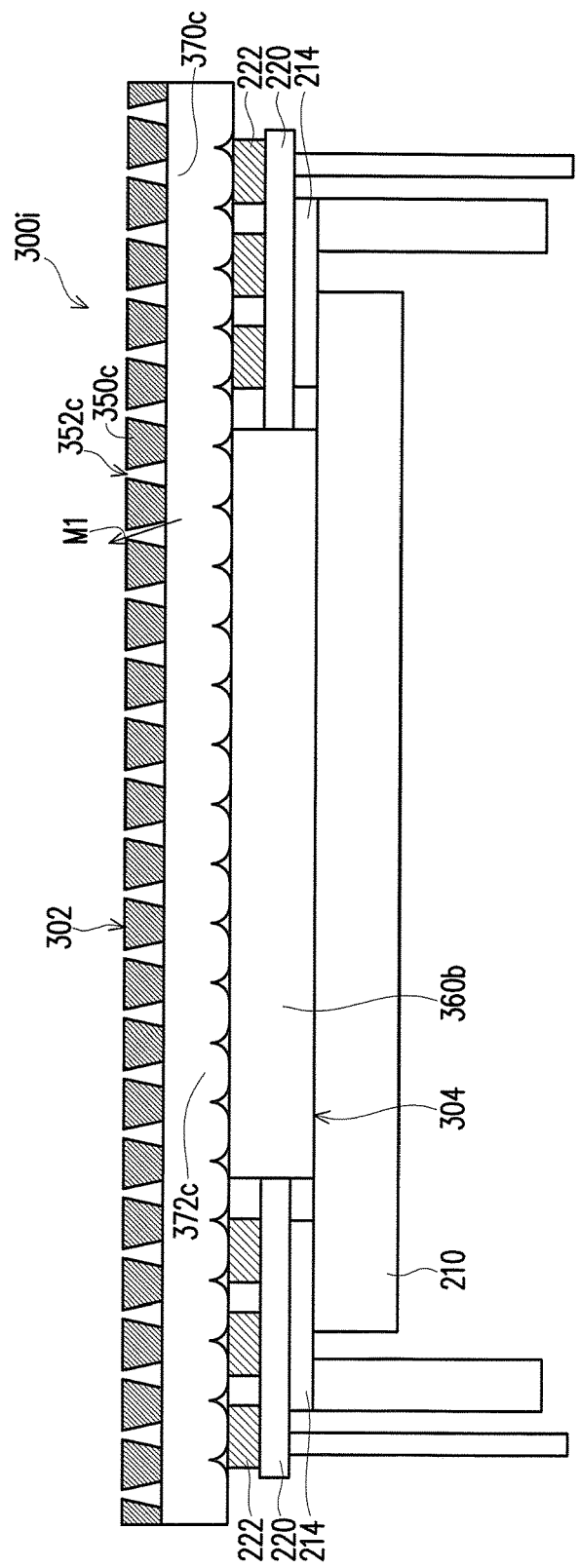
FIG. 11 is a partial schematic diagram of a display apparatus according to still another embodiment of the invention.

FIG. 11 is a partial schematic diagram of a display apparatus according to still another embodiment of the invention. Referring to FIG. 11, the display apparatus of the embodiment is similar to the display apparatus of FIG. 4A, and a difference therebetween is as follows. In the embodiment, the lens array 370c of the image reforming light transmission element 300i is also disposed on the self-luminous display module 220, and the light absorbing sheet 350c is also located above the self-luminous display module 220.

Figure 12:
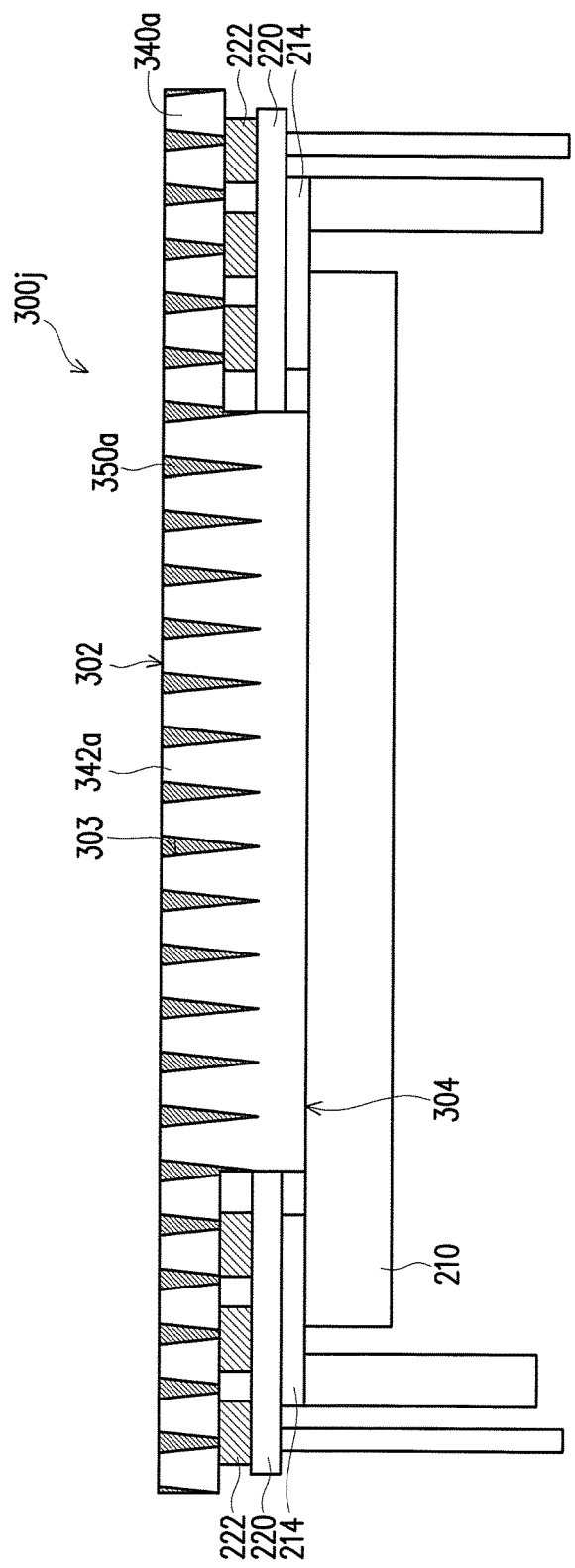
FIG. 12 is a partial schematic diagram of a display apparatus according to still another embodiment of the invention.

FIG. 12 is a partial schematic diagram of a display apparatus according to still another embodiment of the invention. Referring to FIG. 12, the display apparatus of the embodiment is similar to the display apparatus of FIG. 5A, and a difference therebetween is as follows. In the embodiment, the first transparent board 340a of the image reforming light transmission element 300j is also disposed on the on the self-luminous display module 220, and the light guiding pipes 342a and the light absorbing element 350a are also disposed above the self-luminous display module 220.

Figure 13:
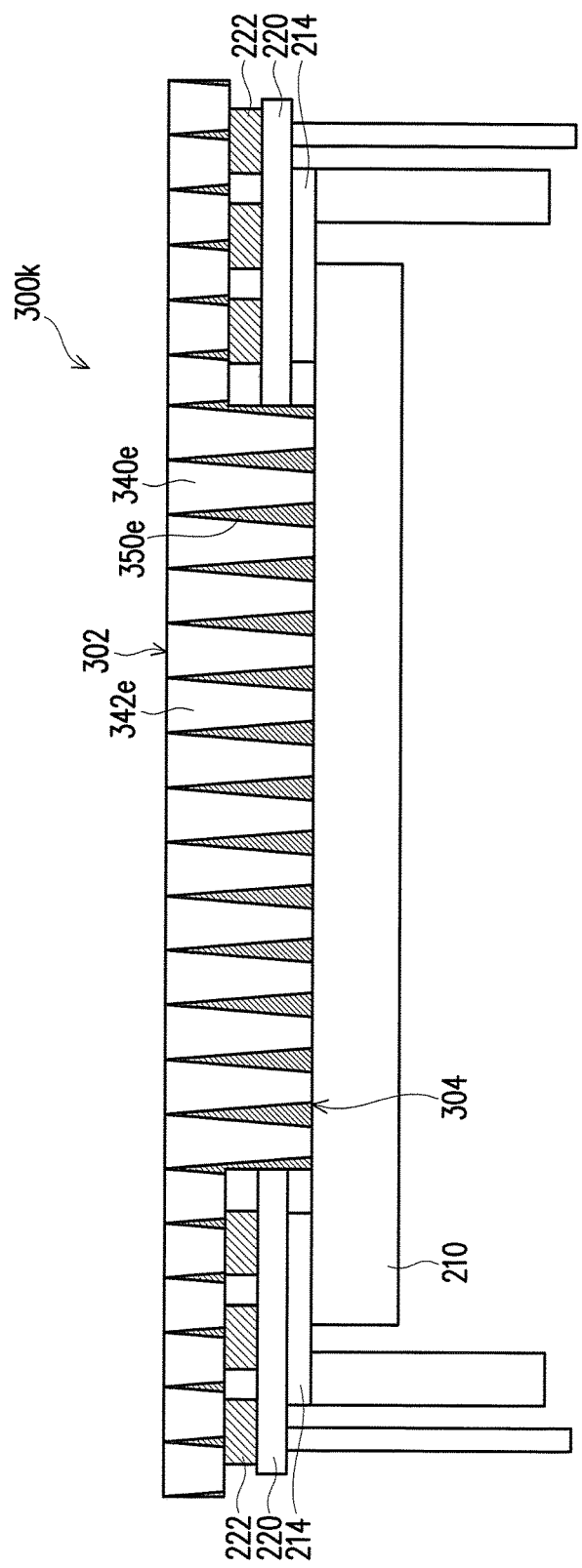
FIG. 13 is a partial schematic diagram of a display apparatus according to still another embodiment of the invention.

FIG. 13 is a partial schematic diagram of a display apparatus according to still another embodiment of the invention. Referring to FIG. 13, the display apparatus of the embodiment is similar to the display apparatus of FIG. 6, and a difference therebetween is as follows. In the embodiment, the first transparent board 340e of the image reforming light transmission element 300k is also disposed on the self-luminous display module 220, and the light guiding pipes 342e and the light absorbing element 350e are also disposed above the self-luminous display module 220.

Figure 14:
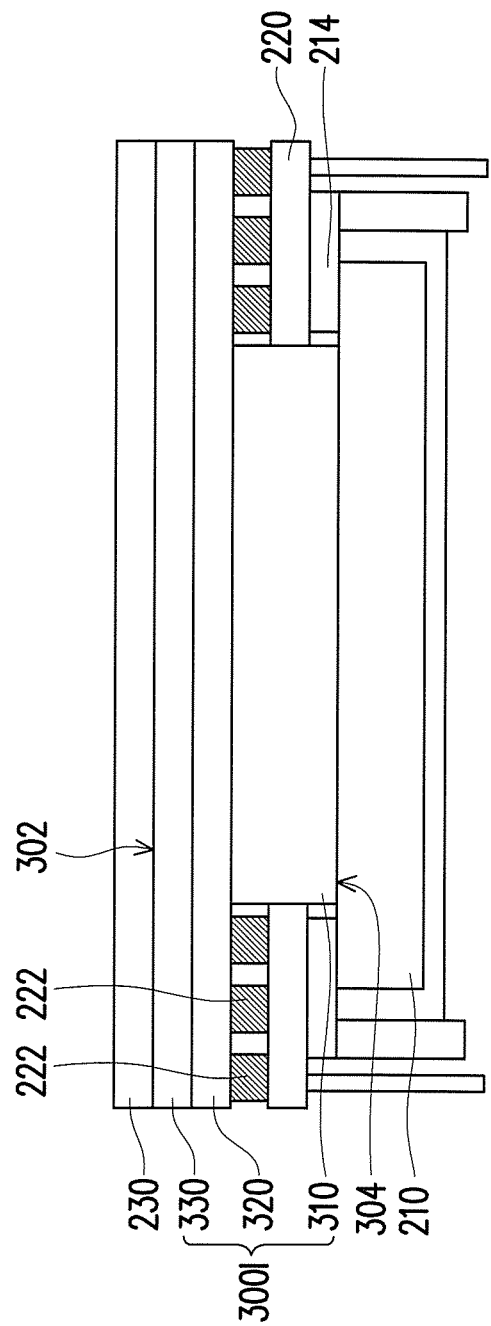
FIG. 14 is a partial schematic diagram of a display apparatus according to still another embodiment of the invention.

FIG. 14 is a partial schematic diagram of a display apparatus according to still another embodiment of the invention. Referring to FIG. 14, the display apparatus of the embodiment is similar to the display apparatus of FIG. 1A, and a difference therebetween is as follows. In the embodiment, the diffuser 320 of the image reforming light transmission element 300l is also disposed on the self-luminous display module 220, and the polarizer 330 is also disposed above the self-luminous display module 220.

Further, since the image reforming light transmission elements 300g, 300h, 300i, 300j, 300k, 3001 of FIG. 9 to FIG. 14 are all disposed on the LCD module 210 and the self-luminous display module 220, the difference between the display effects of the LCD module 210 and the self-luminous display module 220 is further decreased.

In summary, the embodiments of the invention have at least one of the following advantages and effects. In the display apparatus according to the embodiments of the invention, since a design of disposing the self-luminous display module on the edge of the LCD module is adopted, the edge region of the LCD module is effectively used for displaying, and the characteristic of the LCD module is maintained. Moreover, the image reforming light transmission element is used to provide natural continuous and integral images, so as to decrease a difference between the display effects of the LCD module and the self-luminous display module, by which image contrast and light usage rate are enhanced.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such teens should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

What is claimed is:

1. A display apparatus, comprising:
   at least one display unit, comprising:
      a liquid crystal display module;
      a self-luminous display module, disposed on an edge of the liquid crystal display module; and
      an image reforming light transmission element, disposed on the liquid crystal display module and having a first surface facing away from the liquid crystal display module and a second surface facing the liquid crystal display module, wherein the first surface, and a display surface of the self-luminous display module that has an orthogonal projection on an upper surface of the liquid crystal display module not overlapping with an orthogonal projection of the first surface on the upper surface of the liquid crystal display module, are substantially coplanar, and the upper surface of the liquid crystal display module faces the image reforming light transmission element.

2. The display apparatus of claim 1, wherein the liquid crystal display module comprises:
   a liquid crystal display panel; and
   a frame, covering an edge of the liquid crystal display panel, wherein the self-luminous display module is disposed on the frame.

3. The display apparatus of claim 1, wherein the self-luminous display module comprises a plurality of light-emitting diodes arranged in an array.

4. The display apparatus of claim 1, wherein an image beam coming from an image displayed by the liquid crystal display module passes through the image reforming light transmission element to form another image on the first surface.

5. The display apparatus of claim 4, wherein the image reforming light transmission element comprises:
   a transparent board, disposed on the liquid crystal display module;
   a diffuser, disposed on the transparent board; and
   a polarizer, disposed on the diffuser, wherein the diffuser is located between the transparent board and the polarizer.

6. The display apparatus of claim 4, wherein the image reforming light transmission element comprises:
   a first transparent board, having the first surface, and the first transparent board having a plurality of notches on the first surface; and
   a light absorbing element, disposed in the notches, wherein a part of the first transparent board surrounded by the light absorbing element forms a plurality of light guiding pipes.

7. The display apparatus of claim 6, wherein a width of the light guiding pipes is progressively decreased from an end close to the second surface towards an end close to the first surface.

8. The display apparatus of claim 6, wherein a width of the light guiding pipes is progressively increased from an end close to the second surface towards an end close to the first surface.

9. The display apparatus of claim 6, wherein the image reforming light transmission element further comprises:
   a second transparent board, disposed between the first transparent board and the liquid crystal display module.

10. The display apparatus of claim 6, wherein the light absorbing element comprises:
    a transparent substrate, having a refractive index lower than a refractive index of the first transparent board; and
    a light absorbing material, doped into the transparent substrate.

11. The display apparatus of claim 6, wherein a pitch of two adjacent light guiding pipes is smaller than or equal to a pitch of two adjacent pixels of the liquid crystal display module.

12. The display apparatus of claim 4, wherein the image reforming light transmission element comprises:
 a transparent board, disposed on the liquid crystal display module;
 a lens array, disposed on the transparent board, and having a plurality of micro lenses arranged in an array; and
 a light absorbing element, disposed on the first surface, and disposed in notches between two adjacent micro lenses.

13. The display apparatus of claim 12, wherein the light absorbing element comprises:
 a transparent substrate, having a refractive index lower than a refractive index of the lens array; and
 a light absorbing material, doped into the transparent substrate.

14. The display apparatus of claim 4, wherein the image reforming light transmission element comprises:
 a transparent board, disposed on the liquid crystal display module;
 a lens array, disposed on the transparent board, and having a plurality of micro lenses arranged in an array; and
 a light absorbing sheet, disposed on the lens array, and having a plurality of holes arranged in an array, wherein the holes are substantially respectively disposed on focuses of the micro lenses.

15. The display apparatus of claim 14, wherein a hole diameter of the holes is progressively decreased from an end close to the lens array towards an end away from the lens array.

16. The display apparatus of claim 4, wherein the display unit further comprises:
 a transparent cover, covering the self-luminous display module and the image reforming light transmission element.

17. The display apparatus of claim 1, wherein the at least one display unit comprises a plurality of display units, and the display units are spliced into the display apparatus, and the self-luminous display modules of any two adjacent display units are connected to each other.

18. The display apparatus of claim 1, wherein the self-luminous display module covers the edge of the liquid crystal display module, and surrounds a display region of the liquid crystal display module.

19. A display apparatus, comprising:
 at least one display unit, comprising:
  a liquid crystal display module;
  a self-luminous display module, disposed on an edge of the liquid crystal display module;
  an image reforming light transmission element, disposed on the liquid crystal display module and directly on the self-luminous display module, and having a first surface facing away from the liquid crystal display module and a second surface facing the liquid crystal display module, wherein an image beam coming from an image displayed by the liquid crystal display module and another image beam coming from the self-luminous display module pass through the image reforming light transmission element to form another image on the first surface.

20. The display apparatus of claim 19, wherein the image reforming light transmission element comprises:
 a transparent board, disposed on the liquid crystal display module;
 a diffuser, disposed on the transparent board, and disposed on the self-luminous display module; and
 a polarizer, disposed on the diffuser, and disposed above the self-luminous display module, wherein the diffuser is located between the transparent board and the polarizer.

21. The display apparatus of claim 19, wherein the image reforming light transmission element comprises:
 a first transparent board, having the first surface, and the first transparent board having a plurality of notches on the first surface, wherein the first surface is located above the liquid crystal display module and the self-luminous display module; and
 a light absorbing element, disposed in the notches, wherein a part of the first transparent board surrounded by the light absorbing element forms a plurality of light guiding pipes.

22. The display apparatus of claim 21, wherein the image reforming light transmission element further comprises:
 a second transparent board, disposed between the first transparent board and the liquid crystal display module.

23. The display apparatus of claim 21, wherein a pitch of two adjacent light guiding pipes is smaller than or equal to a pitch of two adjacent pixels of the liquid crystal display module.

24. The display apparatus of claim 19, wherein the image reforming light transmission element comprises:
 a transparent board, disposed on the liquid crystal display module;
 a lens array, disposed on the transparent board and the self-luminous display module, and having a plurality of micro lenses arranged in an array; and
 a light absorbing element, disposed on the first surface, and disposed in notches between two adjacent micro lenses.

25. The display apparatus of claim 19, wherein the image reforming light transmission element comprises:
 a transparent board, disposed on the liquid crystal display module;
 a lens array, disposed on the transparent board and the self-luminous display module, and having a plurality of micro lenses arranged in an array; and
 a light absorbing sheet, disposed on the lens array, and having a plurality of holes arranged in an array, wherein the holes are substantially respectively disposed on focuses of the micro lenses.

* * * * *